(12) United States Patent
Ongarello

(10) Patent No.: US 11,306,023 B2
(45) Date of Patent: Apr. 19, 2022

(54) MATERIAL COMPRISING A STACK HAVING THERMAL AND ESTHETIC PROPERTIES

(71) Applicant: SAINT-GOBAIN GLASS FRANCE, Courbevoie (FR)

(72) Inventor: Tommaso Ongarello, Le Plessisville-Robinson (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/734,480

(22) PCT Filed: Jun. 6, 2019

(86) PCT No.: PCT/EP2019/064881
§ 371 (c)(1),
(2) Date: Dec. 2, 2020

(87) PCT Pub. No.: WO2019/238542
PCT Pub. Date: Dec. 19, 2019

(65) Prior Publication Data
US 2021/0323861 A1  Oct. 21, 2021

(30) Foreign Application Priority Data
Jun. 12, 2018 (FR) ...................................... 1870681

(51) Int. Cl.
*C03C 17/36* (2006.01)

(52) U.S. Cl.
CPC ........ *C03C 17/366* (2013.01); *C03C 17/3626* (2013.01); *C03C 17/3644* (2013.01);
(Continued)

(58) Field of Classification Search
CPC ............ C03C 17/3644; C03C 17/3642; C03C 17/3647; C03C 17/3649; C03C 17/366;
(Continued)

(56) References Cited

U.S. PATENT DOCUMENTS 5,595,825 A * 1/1997 Guiselin ................. C03C 17/36
359/360
2002/0086164 A1* 7/2002 Anzaki ............... C03C 17/3613
428/432

(Continued)

FOREIGN PATENT DOCUMENTS

WO  WO 2009/145864 A1  12/2009
WO  WO 2012/093238 A1  7/2012
(Continued)

OTHER PUBLICATIONS

International Search Report as issued in International Patent Application No. PCT/EP2019/064881, dated Oct. 9, 2019.

*Primary Examiner* — Z. Jim Yang
(74) *Attorney, Agent, or Firm* — Pillsbury Winthrop Shaw Pittman LLP

(57) ABSTRACT

A material includes a transparent substrate on the surface of which is deposited a stack of layers which itself includes a plurality of functional layers making it possible to influence the solar and/or infrared radiation capable of striking said surface. The material has high thermal performance qualities and also an attractive shiny surface appearance of neutral color.

17 Claims, 3 Drawing Sheets

(52) U.S. Cl.
CPC ...... *C03C 17/3649* (2013.01); *C03C 17/3681* (2013.01); *C03C 2217/216* (2013.01); *C03C 2217/256* (2013.01); *C03C 2217/281* (2013.01); *C03C 2217/78* (2013.01); *C03C 2218/156* (2013.01)

(58) Field of Classification Search
CPC ............ C03C 17/3681; B32B 17/1022; B32B 17/10229
See application file for complete search history.

(56) References Cited

U.S. PATENT DOCUMENTS

| | | | | |
|---|---|---|---|---|
| 2003/0180547 A1* | 9/2003 | Buhay | ................ | C03C 17/3613 428/434 |
| 2005/0123772 A1* | 6/2005 | Coustet | ................ | C03C 17/36 428/432 |
| 2006/0280951 A1* | 12/2006 | Fleury | ................ | B32B 17/10761 428/432 |
| 2007/0082219 A1* | 4/2007 | Fleury | ................ | B32B 17/10229 428/656 |
| 2009/0047466 A1* | 2/2009 | German | ................ | C03C 17/3639 428/98 |
| 2009/0197098 A1* | 8/2009 | Polcyn | ................ | C03C 17/36 428/432 |
| 2009/0295687 A1* | 12/2009 | Wang | ................ | H01J 11/44 345/60 |
| 2010/0046191 A1* | 2/2010 | den Boer | ................ | C03C 17/3639 361/818 |
| 2010/0062245 A1* | 3/2010 | Martin | ................ | C03C 17/36 428/336 |
| 2011/0261442 A1* | 10/2011 | Knoll | ................ | C03C 17/366 359/360 |
| 2011/0262726 A1* | 10/2011 | Knoll | ................ | C03C 17/3626 428/213 |
| 2012/0219821 A1* | 8/2012 | Frank | ................ | C03C 17/3639 428/630 |
| 2012/0225224 A1* | 9/2012 | Blacker | ................ | C03C 17/3639 428/34 |
| 2012/0225304 A1* | 9/2012 | Imran | ................ | C03C 17/3618 428/433 |
| 2012/0225317 A1* | 9/2012 | Imran | ................ | C23C 14/18 428/630 |
| 2013/0057951 A1* | 3/2013 | Hevesi | ................ | G02B 5/0858 359/359 |
| 2013/0059137 A1* | 3/2013 | Hevesi | ................ | C03C 17/3626 428/213 |
| 2014/0072784 A1* | 3/2014 | Dietrich | ................ | C03C 17/3626 428/213 |
| 2014/0168760 A1* | 6/2014 | Theios | ................ | C03C 17/3657 359/360 |
| 2014/0237917 A1 | 8/2014 | Theios et al. | | |
| 2014/0347722 A1* | 11/2014 | Hevesi | ................ | C03C 17/3652 359/359 |
| 2014/0362434 A1* | 12/2014 | Schmitz | ................ | B32B 17/10036 359/350 |
| 2015/0191965 A1* | 7/2015 | Ding | ................ | C03C 17/3644 428/216 |
| 2016/0023942 A1* | 1/2016 | Mahieu | ................ | C03C 17/36 428/336 |
| 2016/0122237 A1* | 5/2016 | Mahieu | ................ | C03C 17/3644 359/359 |
| 2016/0122238 A1* | 5/2016 | Roquiny | ................ | C03C 17/3642 428/336 |
| 2017/0299786 A1* | 10/2017 | Boyum | ................ | C03C 17/36 |
| 2018/0194676 A1* | 7/2018 | Lorenzzi | ................ | C03C 17/36 |
| 2019/0064516 A1* | 2/2019 | Wagner | ................ | B32B 17/10568 |
| 2019/0330101 A1* | 10/2019 | Cid Aguilar | ................ | B32B 17/061 |
| 2019/0375677 A1* | 12/2019 | Boyce | ................ | C03C 17/3639 |
| 2019/0377115 A1* | 12/2019 | Boyce | ................ | C03C 17/3639 |
| 2020/0024185 A1* | 1/2020 | Lee | ................ | C23C 28/04 |
| 2020/0317565 A1* | 10/2020 | Farina | ................ | C03C 17/36 |
| 2021/0017069 A1* | 1/2021 | Hughes | ................ | B32B 17/10431 |
| 2021/0107258 A1* | 4/2021 | Horie | ................ | B32B 17/10201 |

FOREIGN PATENT DOCUMENTS

| | | | | |
|---|---|---|---|---|
| WO | WO-2015014854 A2 * | 2/2015 | ......... | C03C 17/3681 |
| WO | WO 2015/077064 A2 | 5/2015 | | |
| WO | WO 2017/006029 A1 | 1/2017 | | |
| WO | WO 2018/165645 A1 | 9/2018 | | |
| WO | WO-2020115507 A1 * | 6/2020 | .......... | C03C 17/366 |

* cited by examiner

MATERIAL COMPRISING A STACK HAVING THERMAL AND ESTHETIC PROPERTIES

CROSS-REFERENCE TO RELATED APPLICATIONS

This application is the U.S. National Stage of PCT/EP2019/064881, filed Jun. 6, 2019, which in turn claims priority to French patent application number 1870681 filed Jun. 12, 2018. The content of these applications are incorporated herein by reference in their entireties.

The present invention relates to a material comprising a transparent substrate on the surface of which is deposited a stack of layers which itself comprises a plurality of functional layers making it possible to influence the solar and/or infrared radiation capable of striking said surface. The material of the invention is noteworthy in that it has high thermal performance qualities and also an attractive shiny surface appearance of neutral color. The invention also relates to a glazing comprising such a material.

Legal agreements and pronouncements having the objective of reducing the environmental impacts of human activities are increasing at the regional, national and international levels. These agreements and pronouncements are targeted in particular at reducing the energy consumption of infrastructures. They recommend or require especially the equipping of buildings and transportation vehicles so as to reduce the energy consumption of their air conditioning and heating means.

Glass surfaces often constitute the majority of the external surfaces of buildings and transportation vehicles. Their share continues to increase in order to meet the need of users as regards illumination by natural light. However, these glass surfaces can be passive heat sources, in particular during periods of strong exposure to sunlight, and equally well can be heat dissipators during winter periods. Consequently, the variations in temperature inside the buildings and vehicles equipped with these glass surfaces can be very high. These variations in temperature can bring about feelings of discomfort and prompt significant use of the air conditioning and heating means.

For these reasons of energy saving and of comfort, the glass surfaces have to be functionalized in order to influence the incident solar and/or infrared radiation and to reduce the "greenhouse effect" phenomena. These surfaces are generally functionalized by the deposition on said surfaces of a stack of layers comprising functional metal layers. These layers confer, on the surfaces and also on the glazings which comprise them, "selective" functions which make it possible to reduce the amount of energy transmitted through the glazing toward the inside without prejudicing the light transmission in the visible spectrum.

The performance qualities of the functionalized glass surfaces and of the glazings which comprise these surfaces are generally evaluated using three parameters:

the solar factor, g, defined as the ratio of the total energy transmitted through the glass surface or the glazing toward the inside to the incident solar radiation;

the light transmission in the visible spectrum, LT, defined as the ratio of the amount of incident light to the amount of light of the visible spectrum transmitted through the glass surface or the glazing;

the selectivity, s, defined as the ratio of the light transmission LT to the solar factor g, i.e. LT/g.

The greater the selectivity, s, of a functionalized glass surface or of a glazing which comprises a functionalized glass surface, the higher its thermal performance qualities, that is to say the lower the amount of energy transmitted through the glazing toward the inside, ideally without prejudicing the light transmission in the visible spectrum. According to the above definition, a high selectivity can be obtained by increasing the light transmission, LT, and/or by decreasing the solar factor, g.

The light transmission and the solar factor depend especially on the thicknesses of the functional metal layers comprised by the stack of layers deposited on the surface of the transparent substrate which forms the glass surface. The light transmission and the solar factor vary in a contradictory fashion with the thicknesses of the functional layers. The thicker the functional layers, the lower the light transmission but the higher the solar factor. Conversely, the thinner the functional layers, the lower the solar factor but the higher the light transmission.

The functionalized glass surfaces and the glazings which comprise them thus ideally have functions such that:

the light transmission is the highest, at least 45%, indeed even 50%;

the solar factor, g, of at most 30%;

the selectivity, s, is equal to or greater than 1.5, indeed even 1.7.

The glass surfaces can also have an esthetic function for the buildings and the transportation vehicles in which they are liable to be incorporated. In some applications, they have to exhibit, in transmission, in external reflection and in internal reflection, a shiny surface appearance of neutral color, that is to say preferably close to the gray color in the blue-green chromatic range. The shades of the color should ideally not vary by much according to the angle of observation. This surface appearance is esthetically close to that of a mirror.

Such a surface appearance is generally obtained when the external and internal reflections of the glass surface is equal to or greater than 25% and when the values of the two parameters $a^*$ and $b^*$ in the $L^*a^*b^*$ system are close to zero, ideally between −5 and 0. The external and internal reflections dependent in part on the thickness of the functional metal layers. The thicker the functional metal layers, the greater the reflection, and vice versa.

However, in geographic regions where the degree of exposure to sunlight is high and where buildings are liable to comprise glass surfaces with such a shiny surface appearance of neutral color, a high internal reflection can be a source of esthetic annoyance. This is because the artificial lights used inside the buildings may be reflected by the glazing toward the inside of the building by a significant mirror effect. The visibility of the external environment through the glass surfaces may then be considerably degraded. This phenomenon may be more marked at twilight when the external luminosity decreases. In order to avoid it, the internal light reflection should preferably be less than 23%.

It has been found that any increase in the thickness of the functional metal layers brings about a decrease in the light transmission which the simultaneous increase in the solar factor does not make it possible to compensate for. Consequently, although the external reflection increases when the thickness of the functional metal layers increases, the selectivity decreases in a manner prejudicial to the thermal performance qualities. The functionalized glass surface or the glazing which comprises it can thus have a shiny surface appearance but mediocre thermal performance qualities. Moreover, the increase in the thicknesses of the functional metal layers also brings about an increase in the internal reflection prejudicial to esthetic comfort. In addition, this simple increase in the thicknesses of the functional metal layers generally does not make it possible to obtain a neutral color in external reflection, in internal reflection and in transmission.

The present invention solves these problems. It relates to a material comprising a transparent substrate, on at least one surface of which is deposited a stack of layers comprising three silver-based functional metal layers, F1, F2 and F3, with physical thicknesses EF1, EF2 and EF3 respectively, and four dielectric assemblies of layers, E1, E2, E3 and E4, with optical thicknesses are EO1, EO2, EO3 and EO4 respectively, each of the silver-based functional metal layers, F1, F2 and F3, being positioned respectively between the two dielectric assemblies of layers, E1 and E2, E2 and E3, and E3 and E4, said material being characterized in that:
the ratio of the physical thickness EF1 of the functional metal layer F1 to the physical thickness EF2 of the functional metal layer F2 is between 0.95 and 1.05;
the thickness of the physical layer EF3 of the functional metal layer F3 is greater than the physical thicknesses EF1 and EF2 of the functional layers F1 and F2;
the optical thickness EO2 of the dielectric assembly of layers E2 is between 60 and 80 nm;
the optical thickness EO1 of the dielectric assembly of layers E1 is between 200 and 250 nm;
the optical thicknesses EO1, EO2, EO3 and EO4 are such that EO2<EO4<EO3<EO1;
the dielectric assembly of layers E4 comprises at least one layer which absorbs infrared radiation with a physical thickness of between 0.1 nm and 5 nm.

In the present description, the following definitions and conventions are used.

The position of the substrate can be horizontal, vertical or inclined, according to the choice selected for the implementation of the invention. The order of enumeration of the layers or of the assemblies of layers is defined from the substrate in the direction of the surface of the stack opposite the substrate. Thus, the functional metal layer F1 and the dielectric assembly of layers E1 are closest to the substrate. The functional metal layer F3 and the dielectric assembly of layers E4 are furthest from the substrate.

The term "above", respectively "below", describing the position of a layer or of an assembly of layers and defined in relation to the position of a functional layer, means that said layer or said assembly of layers is closer to, respectively further from, the substrate. These two terms, "above" and "below", do not at all mean that the layer or the assembly of layers which they describe and the functional layer with respect to which they are defined are in contact. They do not exclude the presence of other intermediate layers between these two layers. The expression "in contact" is explicitly used to indicate that no other layer is positioned between them.

The term "external", respectively "internal", when it describes a surface of the substrate or an optical or physical parameter of a surface of the substrate, denotes the surface of the substrate directed toward the exterior, respectively toward the interior, of the premises, for example a building or a vehicle, in which the substrate is used.

Without any fuller information or qualifier, the term "thickness" used for a layer corresponds to the physical, real or geometric thickness, t, of said layer. It is expressed in nanometers. The expression "optical thickness" is used to explicitly indicate the optical thickness, denoted to, of a layer. It is defined by the relationship to =nit, where n is the refractive index of the layer and t its physical, real or geometric thickness. The refractive index of the layers is measured at the electromagnetic wavelength of 550 nm. The optical thickness is also expressed in nanometers.

The expression "dielectric assembly of layers" denotes one or more layers in contact with one another forming a stack which is dielectric overall, that is to say that it does not have the functions of a functional metal layer. If the dielectric assembly comprises several layers, the latter can themselves be dielectric. The physical, real or geometric thickness, respectively the optical thickness, of a dielectric assembly of layers corresponds to the sum of the physical, real or geometric thicknesses, respectively of the optical thicknesses, of each of the layers which constitute it.

Within the meaning of the invention, a layer which absorbs in the infrared region is a layer which absorbs predominantly in the range of wavelengths extending from approximately 780 nm to 2500 nm.

In the present description, the expression "based on", used to describe a material or a layer with regard to what it contains, means that the fraction by weight of the constituent which it comprises is at least 50%, in particular at least 70%, preferably at least 90%.

The light transmission, the light reflection, the solar factor and the selectivity are defined, measured and calculated in conformity with the standards EN 410, EN 613, ISO 9050 and ISO 10292. The color is measured in the L*a*b* CIE 1976 chromatic space according to the standard ISO 11664 with a D65 illuminant and a visual field of 2° for the reference observer.

A glazing comprising a material according to the invention exhibits an external light reflection of at least 28%, a light transmission in the visible spectrum of at least 48%, an internal light reflection equal to or less than 23%, a solar factor of at least 25 and a selectivity of at least 1.8. The esthetic appearance of the glazing is characterized by a neutral color in external reflection, in internal reflection and in transmission. In particular, the values of the a* and b* parameters in the L*a*b* chromatic space are close to 0, in particular between −5 and 1.

Each dielectric assembly of layers generally comprises at least one layer based on a dielectric material which can be based on nitrides and/or based on oxides.

The functional metal layers are continuous layers. There are three of them. The fraction by weight of silver present in the silver-based functional metal layers is at least 95%, preferably at least 98%.

In order to reduce the amount of substance deposited, the thicknesses of the silver-based functional metal layers can advantageously be reduced, without prejudicing the thermal and esthetic performance qualities, as long as the ratio of the physical thickness EF1 of the functional metal layer F1 to the physical thickness EF2 of the functional metal layer F2 remains between 0.95 and 1.05, and the thickness of the physical layer EF3 of the functional metal layer F3 remains greater than the physical thicknesses EF1 and EF2 of the functional layers F1 and F2.

In one embodiment of the invention, the sum of the physical thicknesses of the functional layers F1, F2 and F3 is preferably between 30 nm and 36 nm.

As nonlimiting examples, each of the physical thicknesses EF1 and EF2 of the functional layers F1 and F2 can be between 6 nm and 12 nm, preferably between 8 nm and 11 nm, and the physical thickness EF3 of the functional layer F3 can be between 10 nm and 20 nm, preferably between 12 nm and 13 nm.

For the same reason of reduction of the amount of substance deposited, the thicknesses of the dielectric assemblies of layers can be reduced, without prejudicing the thermal and esthetic performance qualities, as long as the optical thickness EO2 of the dielectric assembly of layers E2 is between 60 and 80 nm, as the optical thickness EO1 of the dielectric assembly of layers E1 is between 200 and 250 nm, and as the optical thicknesses EO1, EO2, EO3 and EO4 are such that EO2<EO4<EO3<EO1.

As nonlimiting example, the optical thickness EO3 of the dielectric assembly of layers E3 can be between 150 nm and 190 nm. The optical thickness EO4 of the dielectric assembly of layers E4 can be between 70 nm and 90 nm.

The layer which absorbs infrared radiation of the dielectric assembly of layers E4 can be based on metal nitride. For example, it can be based on nickel chromium nitride, on zinc tin nitride, on titanium nitride or else on titanium nitride.

In one embodiment of the invention, each of the four dielectric assemblies of layers comprises at least one dielectric layer based on a material chosen from silicon nitride, titanium nitride, zinc oxide, zinc tin oxide, titanium oxide, silicon oxide or titanium tin oxide, alone or in combination.

The stack can also comprise, in addition, a "blocking" layer positioned above and in contact with a silver-based functional metal layer. The function of this layer, generally of very low thickness, is to protect the silver layer when the deposition of the subsequent layer is carried out in an oxidizing atmosphere or when certain elements, such as oxygen, are liable to migrate from one layer to the other during a heat treatment. If it is necessary to protect each silver layer, it is advantageous for a blocking layer to be positioned above and in contact with each silver-based functional layer which the stack comprises. This layer is preferably based on metals or alloys chosen from Ti and NiCr.

It is also possible to position a blocking layer below and in contact with a silver-based functional metal layer. If it is necessary to protect each silver layer, it can be advantageous for a blocking layer to be positioned below and in contact with each silver-based functional metal layer which the stack comprises.

In one embodiment of the invention, the stack of layers additionally comprises at least one blocking layer positioned above and in contact and/or below and in contact with a silver-based functional metal layer, the physical thickness of said blocking layer or layers being equal to or less than 5 nm. As nonlimiting example, the blocking layer is a metal layer based on NiCr alloy.

It can be advantageous, for some applications, for the assembly of the stack to comprise a protective layer in order to protect it from possible detrimental physicochemical changes by the atmosphere or the external environment with which it is liable to be in contact. In this sense, the stack of layers can additionally comprise a protective layer positioned above its surface liable to be in contact with the atmosphere, the physical thickness of said protective layer being equal to or less than 5 nm. As nonlimiting example, the protective layer can be a layer based on TiZr alloy.

The stack can additionally comprise at least one "lower contact" stabilizing layer positioned below and in contact with a silver-based functional metal layer. The function of this layer, generally of very low thickness, is to promote the adhesion and the crystallization of the silver. In this sense, it can be advantageous fora such a layer to be positioned below and in contact with each a silver-based functional metal layer which the stack comprises. This layer is preferably based on oxides chosen from zinc oxides, nickel oxides, magnesium oxides, mixed zinc tin oxides, mixed zinc magnesium oxides or mixed zinc titanium oxides.

If a blocking layer is present below and in contact with a silver-based functional metal layer, the "lower contact" layer can preferably be positioned below and in contact with this blocking layer.

The "lower contact" layer is regarded as included in the dielectric assembly of layers which is positioned under the silver-based functional metal layer to which it relates.

The compounds included in the "lower contact" layers can exhibit discrepancies in stoichiometry for the contents of oxygen, of nitrogen and/or of other elements. They can comprise doping elements, such as aluminum for zinc oxide.

It is not required for the compounds included in the layers of the dielectric assemblies of layers, in the blocking layers, in the "lower contact" layers or in the protective layers, in particular those indicated as example, to be perfectly stoichiometric. They can especially exhibit discrepancies in stoichiometry for the contents of oxygen, of nitrogen and/or of other elements, such as doping elements.

The noun "stoichiometry" and its derived adjectives should be interpreted according to the meaning conventional in the technical field. It means in particular that the proportions of the chemical elements constituting a compound correspond to those of the "definite compound", as the thermochemical diagrams or the conventions in force in the technical field define it.

In a first preferred embodiment of the invention, the stack comprises, starting from the transparent substrate:
 a first dielectric assembly of layers, the optical thickness of which is between 200 nm and 250 nm and comprising:
a. a dielectric layer based on silicon nitride, the optical thickness of which is between 200 nm and 230 nm;
b. a "lower contact" layer based on zinc oxide, the optical thickness of which is between 5 and 20 nm;
 a first blocking metal layer based on nickel chromium alloy, the physical thickness of which is between 0.1 nm and 5 nm;
 a first silver-based functional metal layer, the physical thickness of which is between 6 nm and 12 nm;
 a second blocking metal layer based on nickel chromium alloy, the physical thickness of which is between 0.1 nm and 5 nm;
 a second dielectric assembly of layers, the optical thickness of which is between 60 nm and 80 nm and comprising:
a. a dielectric layer based on zinc oxide, the optical thickness of which is between 5 nm and 15 nm;
b. a dielectric layer based on silicon nitride, the optical thickness of which is between 50 nm and 60 nm;
c. a "lower contact" layer based on zinc oxide, the optical thickness of which is between 5 and 15 nm;
 a third blocking metal layer based on nickel chromium alloy, the physical thickness of which is between 0.1 nm and 5 nm;
 a second silver-based functional metal layer, the physical thickness of which is between 6 nm and 12 nm;
 a fourth blocking metal layer based on nickel chromium alloy, the physical thickness of which is between 0.1 nm and 5 nm;
 a third dielectric assembly of layers, the optical thickness of which is between 150 nm and 190 nm and comprising:
a. a dielectric layer based on zinc oxide, the optical thickness of which is between 5 nm and 20 nm;
b. a dielectric layer based on silicon nitride, the optical thickness of which is between 120 nm and 140 nm;

c. a dielectric layer based on zinc tin oxide, the optical thickness of which is between 10 nm and 20 nm;
d. a "lower contact" layer based on zinc oxide, the optical thickness of which is between 5 nm and 15 nm;
  a third silver-based functional metal layer, the physical thickness of which is between 10 nm and 20 nm;
  a fifth blocking metal layer based on nickel chromium alloy, the physical thickness of which is between 0.1 nm and 5 nm;
  a fourth dielectric assembly of layers, the optical thickness of which is between 70 nm and 90 nm and comprising:
a. a dielectric layer based on zinc oxide, the optical thickness of which is between 10 nm and 20 nm;
b. a dielectric layer based on silicon nitride, the optical thickness of which is between 60 nm and 80 nm;
c. a layer a a layer which absorbs infrared radiation based on nickel chromium nitride with a physical thickness of between 0.1 nm and 5 nm.

In a second preferred embodiment of the invention, the stack consists, starting from the transparent substrate, of:
  a first dielectric assembly of layers, the optical thickness of which is between 200 nm and 250 nm and comprising:
a. a dielectric layer based on silicon nitride, the optical thickness of which is between 200 nm and 230 nm;
b. a "lower contact" layer based on zinc oxide, the optical thickness of which is between 5 and 20 nm;
  a first blocking metal layer based on nickel chromium alloy, the physical thickness of which is between 0.1 nm and 5 nm;
  a first silver-based functional metal layer, the physical thickness of which is between 6 nm and 12 nm;
  a second blocking metal layer based on nickel chromium alloy, the physical thickness of which is between 0.1 nm and 5 nm;
  a second dielectric assembly of layers, the optical thickness of which is between 60 nm and 80 nm and comprising:
a. a dielectric layer based on zinc oxide, the optical thickness of which is between 5 nm and 15 nm;
b. a dielectric layer based on silicon nitride, the optical thickness of which is between 50 nm and 60 nm;
c. a "lower contact" layer based on zinc oxide, the optical thickness of which is between 5 nm and 15 nm;
  a third blocking metal layer based on nickel chromium alloy, the physical thickness of which is between 0.1 nm and 5 nm;
  a second silver-based functional metal layer, the physical thickness of which is between 6 nm and 12 nm;
  a fourth blocking metal layer based on nickel chromium alloy, the physical thickness of which is between 0.1 nm and 5 nm;
  a third dielectric assembly of layers, the optical thickness of which is between 150 nm and 190 nm and comprising:
a. a dielectric layer based on zinc oxide, the optical thickness of which is between 5 nm and 20 nm;
b. a dielectric layer based on silicon nitride, the optical thickness of which is between 120 nm and 140 nm;
c. a dielectric layer based on zinc tin oxide, the optical thickness of which is between 10 nm and 20 nm;
d. a "lower contact" layer based on zinc oxide, the optical thickness of which is between 5 nm and 15 nm;
  a third silver-based functional metal layer, the physical thickness of which is between 10 nm and 20 nm;
  a fifth blocking metal layer based on nickel chromium alloy, the physical thickness of which is between 0.1 nm and 5 nm;
  a fourth dielectric assembly of layers, the optical thickness of which is between 70 nm and 90 nm and comprising:
a. a dielectric layer based on zinc oxide, the optical thickness of which is between 10 nm and 20 nm;
b. a dielectric layer based on silicon nitride, the optical thickness of which is between 60 nm and 80 nm;
c. a layer which absorbs infrared radiation based on nickel chromium nitride with a physical thickness of between 0.1 nm and 5 nm.

The transparent substrate according to the invention can be a substrate which is inorganic or organic, rigid or flexible, or flat or bent. It will preferably be colorless in order to minimize the absorption of the light and to thus retain a maximum light transmission.

Examples of organic substrates which can advantageously be used in the implementation of the invention are polymer materials, such as polyethylenes, polyesters, polyacrylates, polycarbonates, polyurethanes or polyamides. These polymers can be fluoropolymers.

Examples of inorganic substrates which can advantageously be employed in the invention are sheets of inorganic glass or glass-ceramic. The glass is preferably a glass of soda-lime-silica, borosilicate, aluminosilicate or else alumino-borosilicate type.

According to one embodiment of the material according to the invention, the stack is deposited on the transparent substrate using conventional deposition methods known to a person skilled in the art. Preferably, the stack can be deposited by the magnetic-field-assisted cathode sputtering method (magnetron process).

In a specific embodiment of the invention, the transparent substrate is a sheet of inorganic glass.

When the substrate is a sheet of inorganic glass, the material can be subjected to a tempering heat treatment. After the heat treatment, an external light reflection of at least 28%, a light transmission in the visible spectrum of at least 48%, an internal light reflection equal to or less than 23%, a solar factor of at least 25, a selectivity of at least 1.8, and values of the a* and b* parameters in the L*a*b* chromatic space of close to 0, especially of between −5 and 1.

An example of heat treatment consists in heating the material at temperatures of between 550° C. and 750° C. for several minutes and in then rapidly cooling it under air or by any other appropriate means. The period of time during which the material is heated varies as a function of the thickness of the glass sheet. The usual periods of time for glass sheets intended for glazings are between 30 seconds and 5 minutes.

When the transparent substrate is a glass sheet, the material according to the invention can then be an element of a monolithic, laminated or multiple glazing.

A monolithic glazing comprises only a single glass sheet. When the material according to the invention is used as monolithic glazing, the stack is preferably deposited on the face of the glass sheet directed toward the inside of the room of the building on the walls of which the glazing is installed. In such a configuration, it can be advantageous to protect the stack from physical or chemical damage using an appropriate means.

A multiple glazing comprises at least two parallel glass sheets separated by an insulating gas-filled cavity. The majority of multiple glazings are double or triple glazings, that is to say that they respectively comprise two or three glazings. When the material according to the invention is used as element of a multiple glazing, the stack is preferably deposited on the face of the glass sheet directed toward the inside in contact with the insulating gas. This arrangement has the advantage of protecting the stack from chemical or physical damage from the external environment.

A laminated glazing comprises at least two parallel glass sheets separated by an inserted sheet. This inserted sheet is generally an organic material, such as, for example, polyvinyl butyral (PVB). When the material according to the invention is used as element of a laminated glazing, the stack can be deposited on any one of the faces of the glass sheet, whether or not these faces are in contact with the inserted sheet. The deposition of the stack on the face of the glass sheet in contact with the inserted sheet can be advantageous in protecting it from chemical or physical damage from the external environment. However, care needs to be taken that the constituents of the inserted sheet are not likely to interact with the layers of the stack and to cause damage to it.

A glazing comprising a material according to the invention exhibits a neutral color in external reflection in the blue or blue-green chromatic range. The visual appearance varies little whatever the angle of observation. In the L*a*b* system, the color of the glazing is preferably characterized, in external reflection, by a value for the a* parameter of between −5 and 0 and a value of the b* parameter of between −5 and 0.

The characteristics and the advantages of the material according to the invention are illustrated by the examples described below and the figures pertaining thereto.

Figure 1:
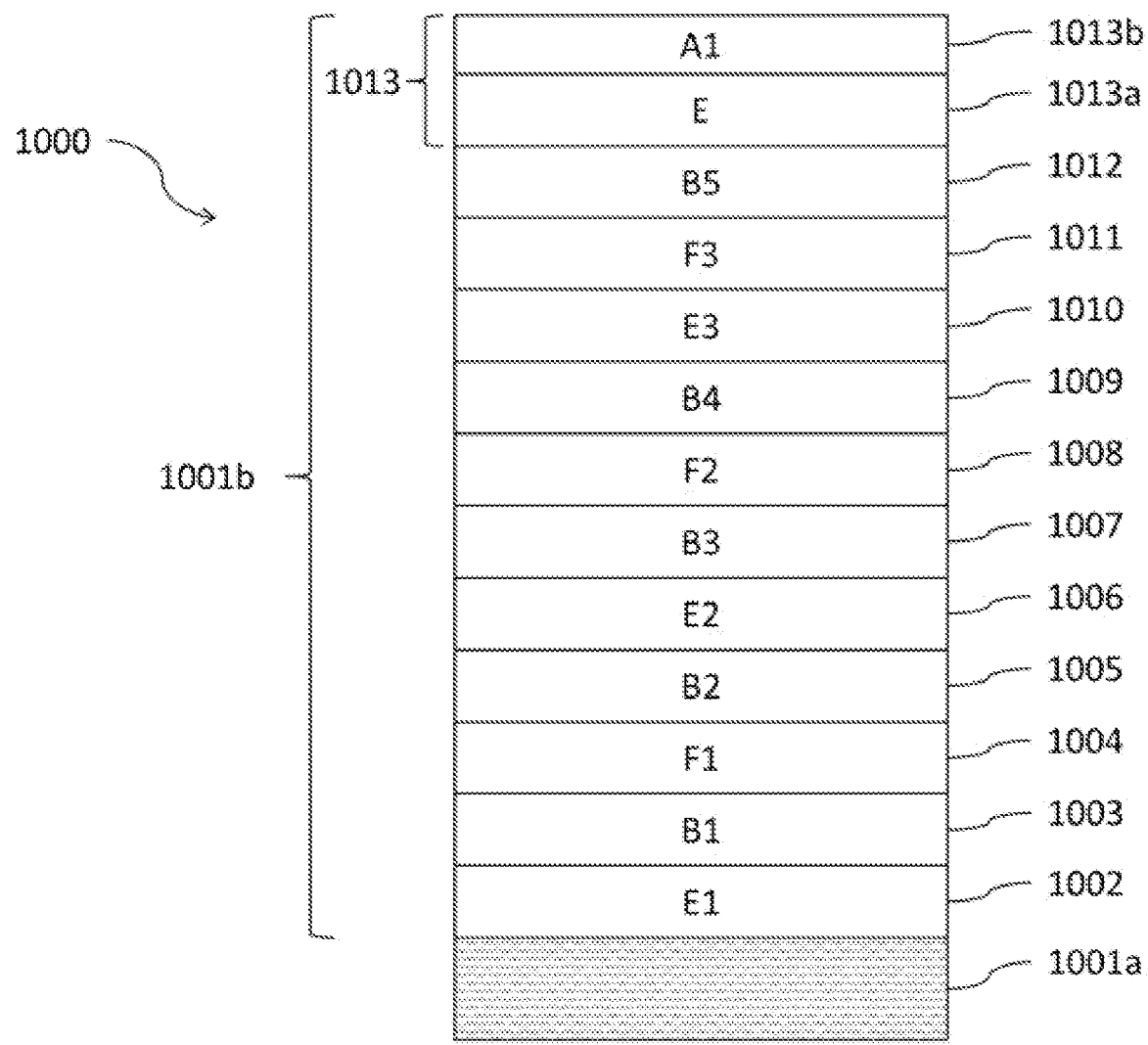
FIG. 1 is a diagrammatic representation of a first embodiment of a material of the invention.

FIG. 1 diagrammatically represents an embodiment of the material of the invention. The material 1000 comprises a transparent substrate 1001a, on at least one surface of which is deposited a stack of layers 1001b comprising three silver-based functional metal layers 1004, 1008 and 1011 and four dielectric assemblies of layers 1002, 1006, 1010 and 1013, each of the silver-based functional metal layers 1004, 1008 and 1011 being respectively positioned between the two dielectric assemblies of layers 1002 and 1006, 1006 and 1010, and 1010 and 1013. The stack can additionally comprise five blocking layers 1003, 1005, 1007, 1009 and 1012. A first blocking layer 1003 is positioned below and in contact with the first functional metal layer 1004. A second blocking layer 1005 is positioned above and in contact with the first functional metal layer 1004. A third blocking layer 1007 is positioned below and in contact with the second functional metal layer 1008. A fourth blocking layer 1009 is positioned above and in contact with the second functional metal layer 1008. A fifth blocking layer 1012 is positioned above and in contact with the third functional metal layer 1011. The dielectric assembly of layers 1013 comprises a layer 1013b which absorbs infrared radiation and a dielectric assembly of layers 1013a.

Figure 2:
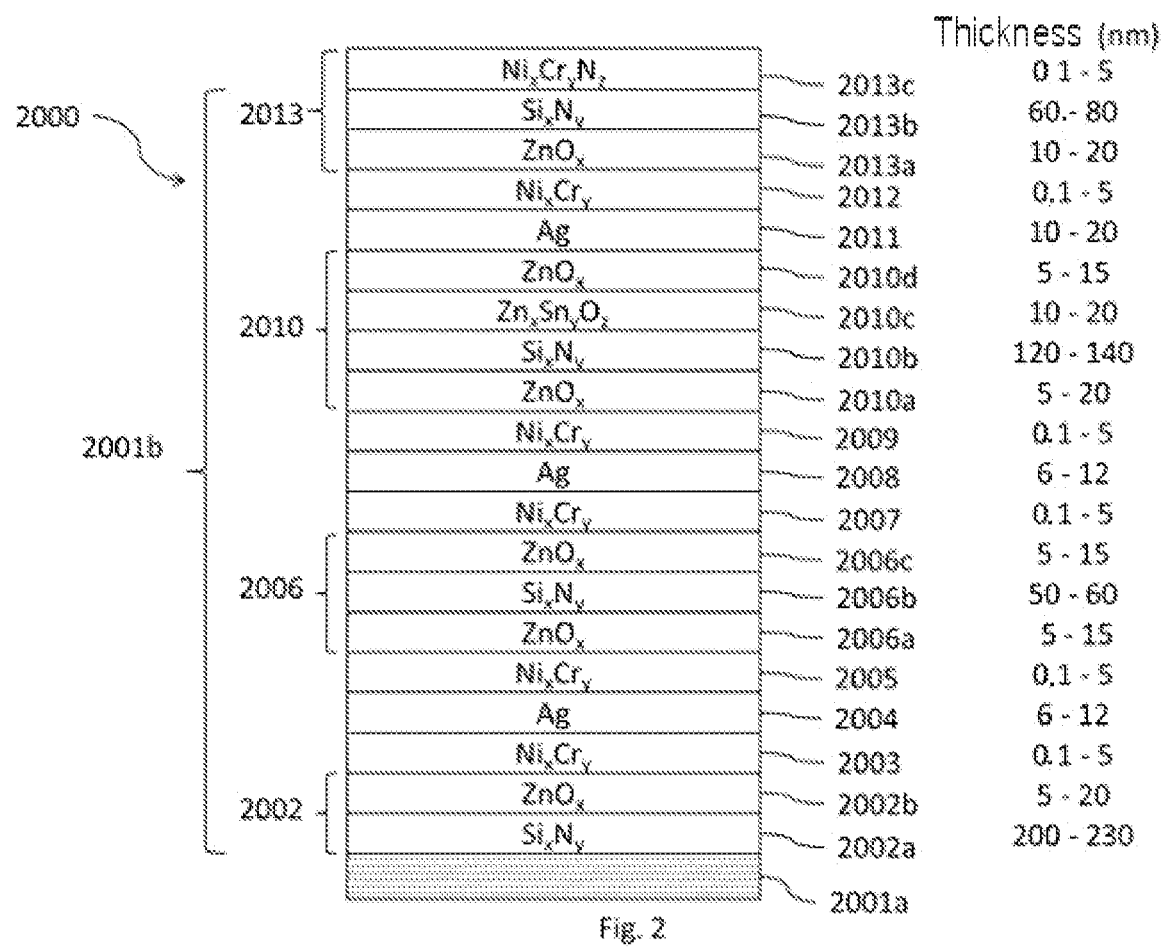
FIG. 2 is a diagrammatic representation of a second embodiment of a material according to the invention.

FIG. 2 diagrammatically represents a second embodiment of the material of the invention. The material 2000 comprises a transparent substrate 2001a, on at least one surface of which is deposited a stack of layers 2001b comprising three silver-based functional metal layers 2004, 2008 and 2011 and four dielectric assemblies of layers 2002, 2006, 2010 and 2013, each of the silver-based functional metal layers 2004, 2008 and 2011 being respectively positioned between the two dielectric assemblies of layers 2002 and 2006, 2006 and 2010, and 2010 and 2013. In the figure, the indices x, y and z associated with the chemical elements of the material forming a layer correspond to the molar ratios of these elements in the material forming the layer. These ratios can be stoichiometric, substoichiometric or superstoichiometric. For example, the stack 2001b can comprise, starting from the transparent substrate 2001a:

a first dielectric assembly of layers 2002, the optical thickness of which is between 200 nm and 250 nm and comprising:

a. a dielectric layer 2002a based on silicon nitride, the optical thickness of which is between 200 nm and 230 nm;
b. a "lower contact" layer 2002b based on zinc oxide, the optical thickness of which is between 5 and 20 nm;

a first blocking metal layer 2003 based on nickel chromium alloy, the physical thickness of which is between 0.1 nm and 5 nm;

a first silver-based functional metal layer 2004, the physical thickness of which is between 6 nm and 12 nm;

a second blocking metal layer 2005 based on nickel chromium alloy, the physical thickness of which is between 0.1 nm and 5 nm;

a second dielectric assembly of layers 2006, the optical thickness of which is between 60 nm and 80 nm and comprising:

a. a dielectric layer 2006a based on zinc oxide, the optical thickness of which is between 5 nm and 15 nm;
b. a dielectric layer 2006b based on silicon nitride, the optical thickness of which is between 50 nm and 60 nm;
c. a "lower contact" layer 2006c based on zinc oxide, the optical thickness of which is between 5 and 15 nm;

a third blocking metal layer 2007 based on nickel chromium alloy, the physical thickness of which is between 0.1 nm and 5 nm;

a second silver-based functional metal layer 2008, the physical thickness of which is between 6 nm and 12 nm;

a fourth blocking metal layer 2009 based on nickel chromium alloy, the physical thickness of which is between 0.1 nm and 5 nm;

a third dielectric assembly of layers 2010, the optical thickness of which is between 150 nm and 190 nm and comprising:

a. a dielectric layer 2010a based on zinc oxide, the optical thickness of which is between 5 nm and 20 nm;
b. a dielectric layer 2010b based on silicon nitride, the optical thickness of which is between 120 nm and 140 nm;
c. a dielectric layer 2010c based on zinc tin oxide, the optical thickness of which is between 10 nm and 20 nm;
d. a "lower contact" layer 2010d based on zinc oxide, the optical thickness of which is between 5 and 15 nm;

a third silver-based functional metal layer 2011, the physical thickness of which is between 10 nm and 20 nm;

a fifth blocking metal layer 2012 based on nickel chromium alloy, the physical thickness of which is between 0.1 nm and 5 nm;

a fourth dielectric assembly of layers 2013, the optical thickness of which is between 70 nm and 90 nm and comprising:

a. a dielectric layer 2013a based on zinc oxide, the optical thickness of which is between 10 nm and 20 nm;
b. a dielectric layer 2013b based on silicon nitride, the optical thickness of which is between 60 nm and 80 nm;

c. a layer which absorbs infrared radiation 2013c based on nickel chromium nitride with a physical thickness of between 0.1 nm and 5 nm.

The thickness ranges are shown for each layer opposite the corresponding layer in FIG. 2. The thicknesses shown for the layers forming the dielectric assemblies correspond to the optical thicknesses of said layers. The thicknesses shown for the silver-based functional metal layers, the blocking layers, the "lower contact" layers and the protective layer correspond to the physical, real or geometric thicknesses of said layers.

Figure 3:
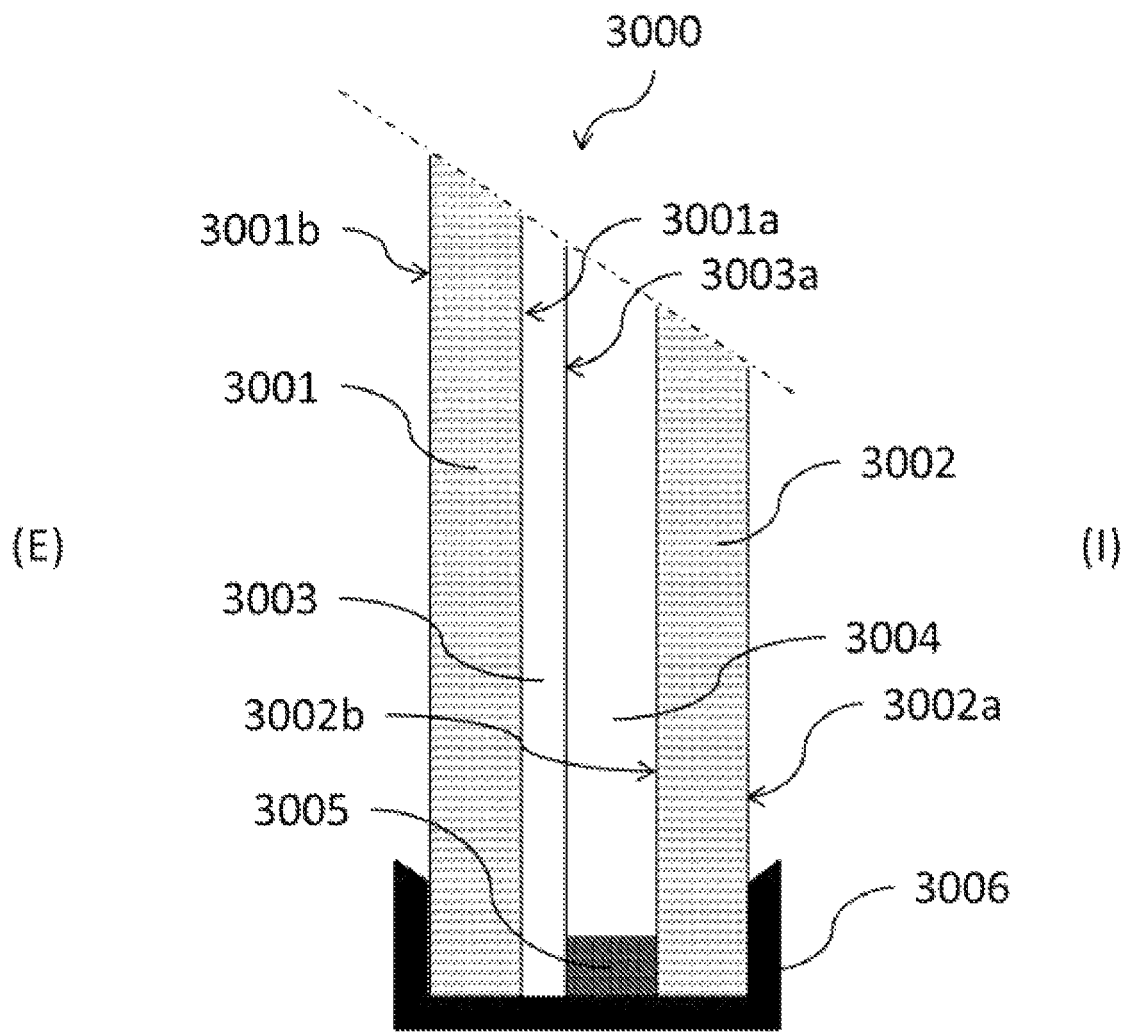
FIG. 3 is a diagrammatic representation of a double glazing comprising a material according to the invention.

FIG. 3 diagrammatically represents a cross section of a double glazing 3000 comprising a material according to the invention. In the figure, (E) corresponds to the outside of the premises where the glazing is installed, and (I) to the inside of the glazing. The glazing 3000 comprises a first glass sheet 3001 with an inner surface 3001a and an outer surface 3001b, a second glass sheet 3002 with an inner surface 3002a and an outer surface 3002b, an insulating gas-filled cavity 3004, a spacer 3005 and a seal 3006. The glass sheet 3001 comprises, on its internal surface 3001a in contact with the gas of the insulating gas-filled cavity 3004, a stack 3003 according to the invention. The stack 3003 is deposited so that its outer surface 3003a, which is opposite that 3001a of the glass sheet 3001, is directed toward the inside (I) of the premises, for example a building or a vehicle, in which the glazing is used.

For the purposes of illustrating the technical effect specific to the present invention, an example, Ex. 1, of material according to the invention and four comparative examples, CEx. 1, CEx. 2, CEx. 3 and CEx. 4, of materials, which do not have the characteristics of the materials according to the invention, were manufactured. They are described in table 1. The stacks of layers were deposited on a transparent substrate corresponding to a sheet of soda-lime-silica glass with a thickness of 6 mm. The conditions for deposition of layers are those normally used by a person skilled in the art for a magnetic-field-assisted cathode sputtering (magnetron process) and widely documented in the literature, for example the patent applications WO2012/093238 and WO2017/006029. After deposition of the stacks on the sheets of soda-lime-silica glass with a thickness of 6 mm, the materials obtained were subjected to a tempering heat treatment. They were heated at between 650° C. and 750° C. for 4 to 6 minutes and then rapidly cooled under air.

The example Ex. 1 of material according to the invention corresponds to the embodiment illustrated by FIG. 1.

Each of these stacks of layers comprises:
three silver-based functional metal layers, denoted F1, F2 and F3 respectively starting from the substrate;
four dielectric assemblies of layers, denoted E1, E2, E3 and E4 respectively.
They can comprise one or more blocking layers, denoted Bi, where i represents the number of the layer.

The values of table 1 correspond to the total optical thicknesses for the dielectric assemblies, that is to say to the sums of the optical thicknesses of the layers which respectively constitute them, and to the physical, real or geometric thicknesses for the silver-based functional metal layers, the blocking layers, the "lower contact" layers and the protective layer.

In table 1, for reasons of clarity, the layer which absorbs infrared radiation included in the dielectric assembly of layers E4 is represented outside the remainder of said assembly E4. It is denoted A1. The thickness shown in the table corresponds to its physical thickness.

TABLE 1

|  | Ex. 1 | CEx. 1 | CEx. 2 | CEx. 3 | CEx. 4 |
|---|---|---|---|---|---|
| A1 | 0.4 | — | — | — | — |
| E4 | 88 | 82.8 | 83.6 | 82.7 | 86.7 |
| B5 | 0.3 | 0.1 | 0.25 | 0.25 | 0.2 |
| F3 | 14.1 | 14 | 12.8 | 12.8 | 20.1 |
| E3 | 167.3 | 161.8 | 167.3 | 171.6 | 178 |
| B4 | 0.3 | 0.1 | 0.1 | 0.1 | 0.3 |
| F2 | 8.6 | 9 | 10.5 | 10.3 | 5.2 |
| B3 | 0.1 | 0.1 | 0.3 | 0.2 | 0.2 |
| E2 | 74.3 | 76.8 | 76.8 | 76.8 | 125.8 |
| B2 | 0.3 | 0.1 | 0.1 | 0.1 | 0.4 |
| F1 | 8.6 | 9 | 10.5 | 10.3 | 9.4 |
| B1 | 0.1 | 0.1 | 0.3 | 0.2 | 0.1 |
| E1 | 223 | 162 | 144.6 | 144.8 | 92.4 |

The values of several parameters which make it possible to evaluate the optical and thermal performance qualities of the examples of materials of table 1 are given in table 2. These values were measured on a double glazing comprising the materials of the examples and as illustrated in FIG. 3. The double glazing 3000 has the following 6/16/4 structure: a sheet of soda-lime-silica glass 3001 with a thickness of 6 mm/an insulating gas-filled cavity 3004 with a thickness of 16 mm containing at least 90% argon/a sheet of soda-lime-silica glass 3002 with a thickness of 4 mm. The stack of layers 3003 is deposited on the internal surface 3001a of the glass sheet 3001 with a thickness of 6 mm.

TABLE 2

|  | Ex. 1 | CEx. 1 | CEx. 2 | CEx. 3 | CEx. 4 |
|---|---|---|---|---|---|
| $T_L$ | 49.7 | 50.6 | 53.2 | 55.5 | 50.2 |
| a*T | −3.6 | −2.9 | −4 | −4.4 | −3 |
| b*T | −1.7 | −0.4 | 1 | 2.7 | −0.3 |
| Rext | 29 | 29.2 | 30 | 26 | 30.6 |
| a*Rext | −3 | −0.5 | −0.8 | −3.5 | −0.8 |
| b*Rext | −2 | −2 | −1.5 | −6.7 | −2.9 |
| Rint | 20 | 24 | 27.5 | 22.2 | 29.5 |
| a*Rint | −2.6 | −7.7 | −6 | −9.7 | −4.2 |
| b*Rint | −3.3 | 2.3 | −0.9 | −10.3 | −1.7 |
| g | 27 | 29.4 | 30 | 29 | 30.5 |
| s | 1.8 | 1.7 | 1.8 | 1.8 | 1.8 |

The light transmission in the visible spectrum, $T_L$, the solar factor, g, and the selectivity, s, and the internal reflection, Rint, and the external reflection, Rext, in the visible spectrum are defined, measured and calculated in conformity with the standards EN 410, EN 613, ISO 9050 and ISO 10292. The color is measured in the L*a*b* CIE 1976 chromatic space according to the standard ISO 11664 with a D65 illuminant and a visual field of 2° for the reference observer.

In table 2:
a*T and b*T are the values of the a* and b* parameters measured in transmission in the L*a*b* CIE 1976 chromatic space with a D65 illuminant, a visual field of 2° for the observer and a zero angle of observation with respect to the normal to the surface of the glazing;
Rext is the value of the light reflection in the visible spectrum, expressed as percentage, measured with a D65 illuminant and a visual field of 2° for the observer on the outer surface 3001b of the sheet of soda-lime-silica glass 3001 with a thickness of 6 mm of said double glazing 3000;
a*Rext and b*Rext are respectively the values of the a* and b* parameters measured in reflection in the L*a*b* CIE 1976 chromatic space with a D65 illuminant and a visual field of 2° for the observer on the outer surface 3001b of the sheet of soda-lime-silica glass 3001 with a thickness of 6 mm of the double glazing 3000 along a zero angle of observation with respect to the normal to the surface of the double glazing 3000;

Rint is the value of the light reflection in the visible spectrum, expressed as percentage, measured with a D65 illuminant and a visual field of 2° for the observer on the inner surface 3002a of the sheet of soda-lime-silica glass 3002 with a thickness of 4 mm of the double glazing 3000;

a*Rint and b*Rint are respectively the values of the a* and b* parameters measured in reflection in the L*a*b*CIE 1976 chromatic space with a D65 illuminant and a visual field of 2° for the observer on the inner surface 3002a of the sheet of soda-lime-silica glass 3002 with a thickness of 4 mm of the double glazing 3000 along a zero angle of observation with respect to the normal to the surface of the double glazing 3000.

The example Ex. 1 of material according to the invention exhibits an external light reflection of at least 28%, a light transmission in the visible spectrum of at least 48%, an internal light reflection equal to or less than 23%, a solar factor of greater than 25 and a selectivity of at least 1.8. The esthetic appearance of the glazing is characterized by a neutral color in external reflection, in internal reflection and in transmission. In particular, the values of the a* and b* parameters in the L*a*b* chromatic space are close to 0, of between −5 and 0.

The materials of the counterexamples CEx. 1, CEx. 2 and CEx. 4 exhibit an internal light reflection of greater than 23%. For the counterexamples CEx. 1 and CEx. 2, the values of the a* and b* parameters in the L*a*b* chromatic space in internal reflection are distant from 0 and are not both between −5 and 0. The material of the counterexample CEx. 3 exhibits an internal light reflection of less than 23% and an external light reflection of less than 28%. The values of the a* and b* parameters in the L*a*b* chromatic space in internal reflection are distant from 0 and are not both between −5 and 0.

These examples show that the material of the invention has both high thermal performance qualities and an attractive shiny surface appearance of neutral color.

An example 3 corresponding to a detailed embodiment of example 1 of table 1 is described in table 3. It is represented diagrammatically in FIG. 2. The stacks were deposited on a transparent substrate corresponding to a sheet of soda-lime-silica glass with a thickness of 6 mm. The conditions for deposition of layers are those normally used by a person skilled in the art for a magnetic-field-assisted cathode sputtering (magnetron process) and widely documented in the literature, for example the patent applications WO2012/093238 and WO2017/006029.

TABLE 3

|    | Material | Ex. 3 |
|----|----------|-------|
| A1 | NiCrN    | 0.4   |
| E4 | SiN      | 36    |
|    | ZnO      | 5     |
| B5 | NiCr     | 0.3   |
| F3 | Ag       | 14.1  |
| E3 | ZnO      | 5     |
|    | SnZnO    | 8     |
|    | SiN      | 60    |
|    | ZnO      | 5     |
| B4 | NiCr     | 0.1   |
| F2 | Ag       | 8.6   |
| B3 | NiCr     | 0.3   |

TABLE 3-continued

|    | Material | Ex. 3 |
|----|----------|-------|
| E2 | ZnO      | 5     |
|    | SiN      | 23.5  |
|    | ZnO      | 5     |
| B2 | NiCr     | 0.1   |
| F1 | Ag       | 8.6   |
| B1 | NiCr     | 0.1   |
| E1 | ZnO      | 5     |
|    | SiN      | 98    |

The values of table 3 correspond to the physical, real or geometric thicknesses for all the layers included in the dielectric assemblies, the silver-based functional metal layers and the blocking layers. The "lower contact" layers are included in the dielectric assemblies.

The refractive indexes of the layers of the dielectric assemblies were measured at the electromagnetic wavelength of 550 nm. The optical thickness of a dielectric assembly corresponds to the sum of the optical thicknesses of the layers which form it. For the example Ex. 3, the optical thicknesses EO1, EO2, EO3 and EO4 of the dielectric assemblies of layers E1, E2, E3 and E3 of table 3 are respectively 223 nm, 74 nm, 167 nm and 88 nm.

The example Ex. 3 of table 3 makes it possible to achieve the desired thermal and esthetic performance qualities. The external light reflection of at least 28%, a light transmission in the visible spectrum of at least 48%, an internal light reflection equal to or less than 23%, a solar factor of greater than 25 and a selectivity of at least 1.8. The esthetic appearance of the glazing is characterized by a neutral color in external reflection, in internal reflection and in transmission. In particular, the values of the a* and b* parameters in the L*a*b* chromatic space are close to 0, of between −5 and 0.

The invention claimed is:

1. A material comprising a transparent substrate, on at least one surface of which is deposited a stack of layers comprising three silver-based functional metal layers, F1, F2 and F3, with physical thicknesses EF1, EF2 and EF3 respectively, and four dielectric assemblies of layers, E1, E2, E3 and E4, with optical thicknesses EO1, EO2, EO3 and EO4 respectively, each of the silver-based functional metal layers, F1, F2 and F3, being positioned respectively between the two dielectric assemblies of layers, E1 and E2, E2 and E3, and E3 and E4, wherein:

the dielectric assembly of layers E1 includes all dielectric layers arranged between the transparent substrate and the functional metal layer F1, the dielectric assembly of layers E2 includes all dielectric layers arranged between the functional metal layer F1 and the functional metal layer F2, the dielectric assembly of layers E3 includes all dielectric layers arranged between the functional metal layer F2 and the functional metal layer F3, and the dielectric assembly of layers E4 includes at least two dielectric layers that are closest to the functional metal layer F3, a ratio of the physical thickness EF1 of the functional metal layer F1 to the physical thickness EF2 of the functional metal layer F2 is between 0.95 and 1.05;

the physical thickness EF3 of the functional metal layer F3 is greater than the physical thicknesses EF1 of the functional metal layer F1 and the physical thickness EF3 of the functional metal layer F3 is greater than the physical thickness EF2 of the functional metal layers F2;

the optical thickness EO2 of the dielectric assembly of layers E2 is between 60 and 80 nm;

the optical thickness EO1 of the dielectric assembly of layers E1 is between 200 and 250 nm;

the optical thicknesses EO1, EO2, EO3 and EO4 are such that EO2<EO4<EO3<EO1;

the dielectric assembly of layers E4 comprises at least one layer which absorbs infrared radiation with a physical thickness of between 0.1 nm and 5 nm.

2. The material as claimed in claim 1, wherein each of the physical thicknesses EF1 and EF2 of the functional metal layers F1 and F2 is between 6 nm and 12 nm.

3. The material as claimed in claim 1, wherein the physical thickness EF3 of the functional metal layer F3 is between 10 nm and 20 nm.

4. The material as claimed in claim 1, wherein a sum of the physical thicknesses of the functional metal layers F1, F2 and F3 is between 30 nm and 36 nm.

5. The material as claimed in claim 1, wherein the optical thickness EO3 of the dielectric assembly of layers E3 is between 150 nm and 190 nm.

6. The material as claimed in claim 1, wherein the optical thickness EO4 of the dielectric assembly of layers E4 is between 70 nm and 90 nm.

7. The material as claimed in claim 1, wherein the layer which absorbs infrared radiation of the dielectric assembly of layers E4 is based on metal nitride.

8. The material as claimed in claim 1, wherein each of the four dielectric assemblies of layers comprises at least one dielectric layer based on a material chosen from silicon nitride, titanium nitride, zinc oxide, zinc tin oxide, titanium oxide, silicon oxide or titanium tin oxide, alone or in combination.

9. The material as claimed in claim 1, wherein the stack of layers additionally comprises at least one blocking layer positioned above and in contact and/or below and in contact with a silver-based functional metal layer, the physical thickness of said blocking layer or layers being equal to or less than 5 nm.

10. The material as claimed in claim 9, wherein the blocking layer is a metal layer based on NiCr alloy.

11. The material as claimed in claim 1, wherein the stack of layers additionally comprises a protective layer positioned above said stack of layers, the physical thickness of said protective layer being equal to or less than 5 nm.

12. The material as claimed in claim 11, wherein the protective layer is a layer based on TiZr alloy.

13. The material as claimed in claim 1, wherein the transparent substrate is a glass sheet.

14. The material as claimed in claim 13, wherein, after a tempering heat treatment, said material exhibits an external light reflection of at least 28%, a light transmission in the visible spectrum of at least 48%, an internal light reflection equal to or less than 23%, a selectivity of at least 1.8, and values of the a* and b* parameters in the L*a*b* chromatic space are between −5 and 1.

15. A glazing comprising a material as claimed in claim 1.

16. The material as claimed in claim 2, wherein each of the physical thicknesses EF1 and EF2 of the functional metal layers F1 and F2 is between 8 nm and 11 nm.

17. The material as claimed in claim 3, wherein the physical thickness EF3 of the functional metal layer F3 is between 12 nm and 13 nm.

* * * * *